May 24, 1960    E. SCHNITZER    2,937,724
DOUBLE ACTING LOW BAND PASS SHOCK ABSORBER
Filed Sept. 30, 1957    2 Sheets-Sheet 1

INVENTOR
EMANUEL SCHNITZER
BY
ATTORNEYS

INVENTOR
EMANUEL SCHNITZER

United States Patent Office 2,937,724
Patented May 24, 1960

2,937,724

DOUBLE ACTING LOW BAND PASS SHOCK ABSORBER

Emanuel Schnitzer, 822 19th Place, Newport News, Va.

Filed Sept. 30, 1957, Ser. No. 687,308

2 Claims. (Cl. 188—88)

(Granted under Title 35, U.S. Code (1952), sec. 266)

The invention described herein may be manufactured and used by or for the Government of the United States of America for governmental purposes without the payment of any royalties thereon or therefor.

This invention relates to shock absorbers with particular reference to shock absorbers of the double acting type capable of selecting predetermined frequencies of disturbances for transmission between machine elements.

In my copending application Serial No. 585,128, filed May 15, 1956, there is described a frequency selective shock absorber of simplified construction illustrative of the operative principles of a double acting shock absorber. In this application there is shown a double acting shock absorber possessing certain advantages in construction and use, which will now be described.

An important object of the invention is to provide a shock absorber operative in opposite directions to select a range of frequencies for force transmittal. An object, also, is to provide a double acting shock absorber which is yieldable at high loading frequencies or rates of increase of load. Still another object is to provide a double acting shock absorber with means for recycling itself for high frequency oscillations while damping a low frequency load at the same time. Further, objects relate to the provision of means permitting rapid re-cycling for low frequency vibrations which may be un-symmetrical in nature, as well as automatic high frequency recycling. An object, also, is the provision of a double acting shock absorber having a small number of moving parts.

Figure 1:
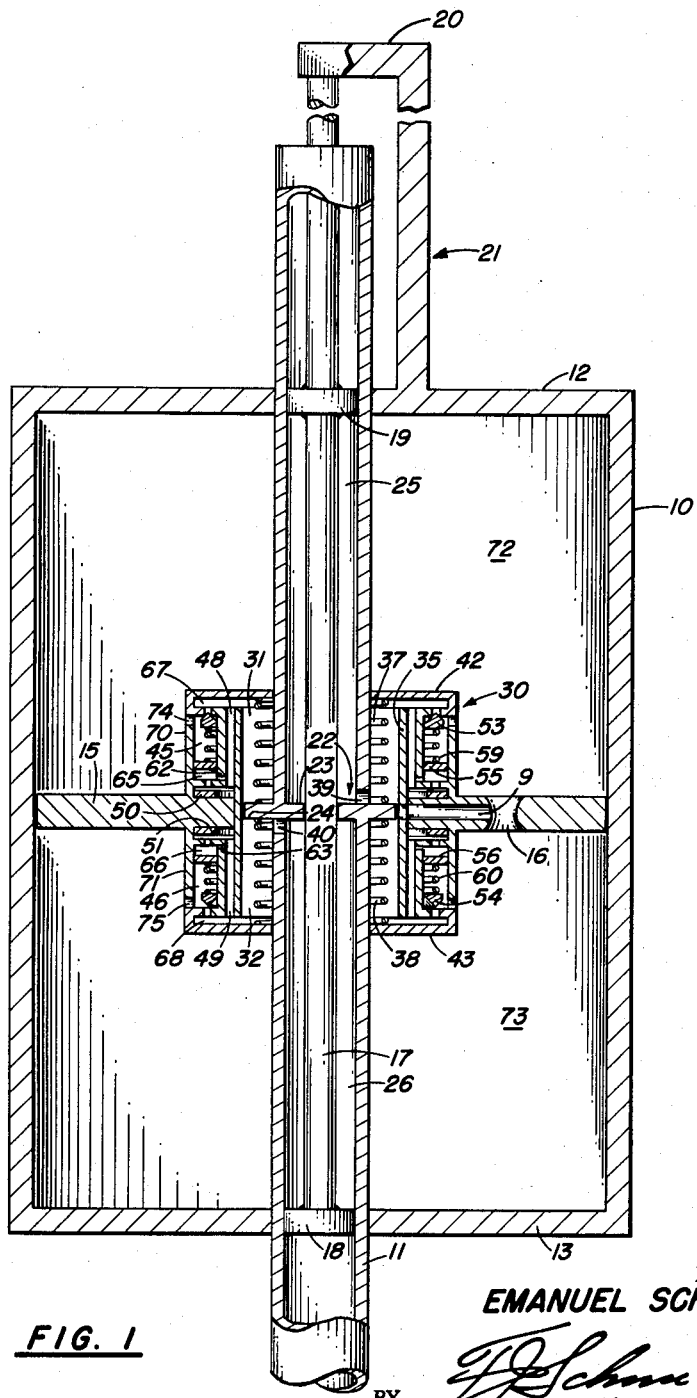
Figure 2:
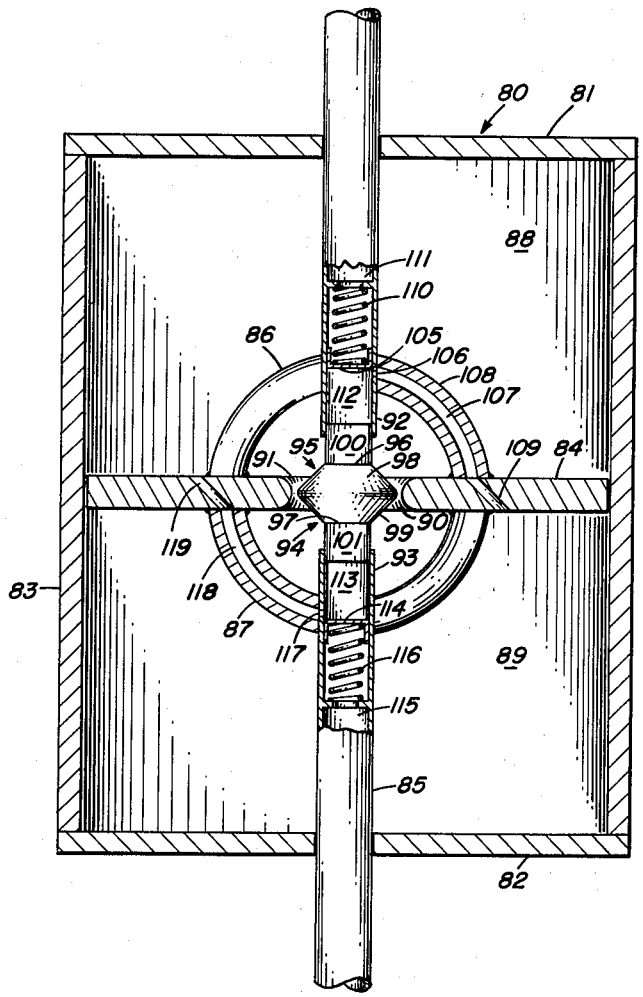

Other objects and many of the attendant advantages of this invention will be readily appreciated as the same becomes better understood by reference to the following detailed description when considered in connection with the accompanying drawings wherein:

Fig. 1 is a view in vertical section of one form of double acting shock absorber; and Fig. 2 is a sectional view of a modified form of shock absorber.

Referring to Fig. 1, an elongated hollow cylinder 10 is fixed to one machine element as an aircraft body, and the main piston rod 11, which is hollow throughout its length and movable axially through the cylinder, is fixed to another coacting machine element, as a wheel supporting the body. The hollow cylinder 10 is closed at both ends by end plates 12 and 13; and within the cylinder, about midlength of the rod 11, a main piston 15 is slideably attached to rod 11 transversely of the cylinder so that axial movement of said piston 15 will simultaneously compress the cylinder fluid on one side of the piston and decrease pressure on the other piston side. One or more main orifices 16 are formed through the piston as indicated in the figure. Centrally of the piston 15, and through a transverse opening therethrough, an auxiliary piston rod 17 extends concentrically of the main piston rod 11, the lower end of rod 17 terminating in a first small piston 18, in the plane of cylinder end 13, and, adjacent the upper end of the auxiliary rod 17 in the plane of cylinder end 12, the rod 17 being provided with a second small piston 19. The transverse diameters of small pistons 18 and 19 are such as to insure a close sliding fit of the piston peripheries against the inner wall of the main piston rod 11. Above small piston 19, the auxiliary piston rod 17 extends beyond the open end of main piston rod 11 and is attached fixedly to an offset arm 20 of bracket 21 permanently secured to the end wall 12 of cylinder 10. Centrally of the main piston rod 11 within cylinder 10, a dividing control piston 22 is formed surrounding rod 17 and having an inner section 23 and an outer section 24, the inner section dividing the internal space of main piston rod 11 into upper region 25 and lower region 26, and the outer section 24 forming a control element and valve as will now be described.

A hollow control cylinder 30 is mounted on main piston 15 so that it extends equally above and below the piston and is concentric with the main piston rod 11 with which it has sliding contact. This control cylinder includes two inner annular compartments 31 and 32, above and below the external section 24 of dividing piston 22, these compartments being bounded on the inside by the outer wall of main piston rod 11, and on the outside by an open end tube 35, ringing the central opening in main piston 15 through which the main piston rod moves. The diameter of tube 35 is such as to make it a cylinder component for the movement of dividing piston 22, and this piston is normally balanced centrally of tube 35 by the action of upper and lower light springs 37 and 38. In this way, the control cylinder 30, with the attached main piston 15, is yieldably supported on the main piston rod 11. Access between compartment 31 and piston compartment 25 is by way of intervening wall duct 39, and between compartment 32 and 26 by duct 40. The main piston 15 is penetrated radially between the central piston rod opening and main orifice 16 by a duct 9.

The tube 35, at both ends, stops short of the respective top and bottom plates 42 and 43, respectively, of the control cylinder 30, thereby leaving an annular passage way for movement of fluids from compartments 31 and 32. The control cylinder, also, is provided with outer annular compartments 45 and 46 above and below main piston 15, the external control cylinder wall forming the outer wall of these compartments and the inner walls being formed by cylindrical shells spaced outwardly from the tube 35 to form annular passageways 48 and 49. Both ends of annular compartments 45 and 46 are closed by annular valves, the compartment ends nearer the main piston being closed by ring check valves 50 and 51 and the other compartment ends being closed by spring valves 53 and 54. Annular pistons 55 and 56 are slidably movable in external compartments 45 and 46, the sliding movements exerting pressures against coil springs 59 and 60 lying between pistons 55 and 56 and their associated valves 53 and 54. Bleed orifices 62 and 63 communicate, respectively, from chamber 65 between the piston 55 and check valve 50 of compartment 45 with annular passageway 48, and from chamber 66 between piston 56 and check valve 51 of compartment 46 with annular passageway 49. Valve 53 communicates with passageway 48 and chamber 31 through radial passage 67, and valve 54 communicates with passageway 49 and chamber 32 through radial passage 68. Compartments 45 and 46 have external outlets through the control cylinder side walls 70 and 71 into main cylinder regions 72 and 73 by means of orifices 74 and 75, respectively.

The operation of the shock absorber of Fig. 1 is as follows, assuming that cylinder 10 is filled with an incompressible fluid, such as oil, and is attached to one element of a mechanism, and piston rod 11 is attached to another element of the mechanism, the intent being to absorb selectively vibrations developing between said elements. Also, for simplicity of consideration, a single up and down pulse will be considered although a vibration normally consists of a series of alternating pulses; also, it will be assumed that the initial force is applied rapidly on rod 11 with cylinder 10 stationary.

With the above assumptions, force is applied to move rod 11 upwardly at a rapid rate. As the rod rises, piston 24, which moves both in the intra-rod space 25—26 and the intra-control compartment 31—32, goes up, compressing the fluid in region 25 and forcing this fluid into the inner control compartment 31 through orifice 39, opening valve 53 and thence flowing out of the control cylinder through duct 74 into region 72. The force of this pulse is in a direction tending to close check valve 50. Since the pulse is rapid and of short duration, very little fluid is forced through bleed orifice 62 into region 65 below piston 55. Thus, the fluid pressure, required to open valve 53 against uncompressed spring 59, is small, with the result that the pressures, in rod space 25 and control compartment 31, are relatively low. As a result, control cylinder 30 and piston 15 are not forced away from their original position in cylinder 10 between end plates 12 and 13, as a result of the pulse. By the same token, since rod region 26 is expanded by the upward motion of main piston rod 11, fluid is sucked into region 26 through main orifice 16 by way of duct 9, region 32 and orifice 40. If valve 54 is slightly open, fluid may also enter the piston rod region 26 from region 73 through orifices 75 and valve 54 into compartment 32 and thence into space 26. Thus for rapidly applied loads or motions, piston rod 11, effectively, is disconnected from piston 15 so that only a small force is transmitted or damped by the absorber. Following the upward pulse on rod 11, if no other pulse is applied, centering spring 37 will gradually raise control cylinder 30 relative to main rod 11 until main piston 15 is again centered on control piston 22. If a reverse or downward pulse is next applied to rod 11, it is evident that a movement, the reverse of that which has been described, will occur.

For a pulse having a low rate of application, wherein main piston rod 11 is taken to move in the upward direction, a different action takes place. In this case, the fluid in region 25 is again pressurized, but at a lower rate, so that fluid is forced through orifice 39 into region 31 and thence through the passages 67 and 48 to close the annular check valve 50 and, also through the bleed orifice 62 to space 65 below piston 55. It is assumed in this case, since the pressure rise is gradual, enough fluid can flow through bleed orifice 62 to maintain valve 53 closed, by pressure on piston 55, so that no fluid leaves region 31 through valve 53 and out through orifice 74. Therefore, a gradual pressure increase in regions 25 and 31 occurs so that control cylinder 30 and main piston 15 are forced upward until orifice 9 opens into region 31 to allow fluid to flow from region 25 through orifice 39 into region 31 out through orifices 9 and 16 into region 73. Subsequent to this time, as long as the slowly applied pulse continues, piston 15 will exactly follow main piston rod 11. Fluid from region 72 can now flow through orifice 16 into region 73 so that the shock strut will behave as a conventional fixed orifice shock absorber for these low frequencies or rates of application of the loads or motions. If a rapidly applied pulse is superposed on the slowly applied pulse, the pressure in region 25 will momentarily rise rapidly, which rapidly increases the pressure in region 31. Since the fluid cannot flow through bleed orifice 62 fast enough to increase the force of spring 59 to its new required level and thus, maintain valve 53 closed, this instantaneous pressure rise will open valve 53 momentarily, allowing a burst of fluid to leave region 31 through valve 53 and orifice 74. Thus, rapid pulses, even though superposed on low frequency pulses can be handled exactly as if they existed alone. Returning to the low frequency pulse, as the load or motion drops off, the pressure in region 25 decreases and spring 59 returns piston 55 to its down position by forcing the fluid out of compartment 65 below this piston through check valve 50. The reason that piston 15 is kept centered on piston 22 during slowly applied pulses is to prevent piston 22 from bottoming on either end of control cylinder 30, following a series of unsymmetrical pulses or motions.

The shock absorber of Fig. 2 incorporates certain modified features reducing the number of moving parts and possesses rapid and automatic recycling action. The main cylinder 80 is closed at its ends by plates 81 and 82, the cylindrical shell 83 extending between these end plates. A piston 84 attached to the hollow piston rod 85 by means of arcuate spiders 86 and 87, divides the main cylinder into two regions 88 and 89. A main centrally disposed orifice 90 is formed in the piston 84, the edge 91 of the orifice being rounded as shown. In the space adjacent piston 84 and within the area enclosed by spiders 86 and 87, a section of piston rod 85 is removed to form open inner tubular ends, 92 and 93 and between these ends is positioned the main piston valve unit 94. This unit includes an annular valve head 95 having flat top and bottom surfaces 96 and 97 and a periphery formed of flat surfaces 98 and 99 symmetrically inclined to each other and approaching a rounded annular peak adjacent but displaced from the mid-edge of the curved inner surface 91 of piston aperture 90, so that, while an annular passageway always exists between spaces 88 and 89, the area of this passageway varies with the vertical movement of the valve head 95. Attached to the flat valve head top surface 96 is a cylindrical piston or valve member 100, the top end of which normally enters the end 92 of the main piston rod; and similarly, piston or valve member 101 is attached to the valve head surface 97 below the valve head, both members 100 and 101 having sliding engagement with the adjacent piston ends 92 or 93 and each functioning as valves by being movable completely free of the piston ends on substantial axial displacement of the attached valve head 95.

A small piston head 105 is slidably mounted within the main piston rod 85 above the cylindrical member 100 at a point clearing a bleed orifice 106 in the wall of piston rod 85; the space within piston rod 85 between member 100 and piston head 105 forming a control chamber 112. This bleed orifice provides for fluid communication between control chamber 112 and main cylinder space 89 through a passage 107 in the spider section 108 and a duct 109 through the main piston 84. The small piston head 105 is normally held adjacent the bleed orifice 106 by a spring 110, the spring ends being fixed to the piston 105 and to an inner plug member 111 inside the piston tube. A control chamber 113 is also formed between the slide member 101 and the small piston 114, as held in the rod end by plug member 115 and intervening coiled spring 116. Also, in the wall of the lower chamber 113, a bleed orifice 117 is formed communicating with main cylinder space 88 through spider conduit 118 and piston duct 119.

The shock absorber, as illustrated in Fig. 2, operates in the following manner, assuming a rapid vibratory type of disturbance imposed between the piston rod 85 and the main cylinder 83, filled with an incompressible fluid. To simplify explanation of the action consideration will be limited to a single disturbance with the piston rod 85 being driven upward with respect to the cylinder 83. As a consequence of this upward motion of the piston rod, the fluid in region 88 is compressed rapidly; and, since the pressure in region 89 remains low, the pressure difference across the outer bulge of valve head 95 causes this head to be driven downward, opening wide the orifice 90 and allowing free flow of fluid from region 88 into region 89. Accordingly, no appreciable load is allowed to be developed between piston rod 85 and cylinder 83. Thus, for high frequency pulses or vibrations, very little force is transmitted across the shock absorber. When the valve head 95 is forced downward, the fluid existing in chamber 113, being incompressible in nature, transmits the motion from the valve member 101 to small piston 114, compressing spring 116. As the load pulse drop off, the pressure in region 88 is again reduced, thus reducing the pressure difference across the valve head 95 and permitting the spring 116 to drive the valve head upward to its equilibrium position.

Where the frequency of vibratory motion applied to the shock absorber is low, a different set of controls are effective. Assuming, as in the example of rapid vibratory movement, that the piston rod 85 is driven upward with respect to cylinder 83, but at a low rate of movement, pressure in region 88 is again increased so that fluid tends to flow from this region through orifice 90 into region 89. However, due to the slower pressure build-up in region 88, fluid may, also, flow from region 88 through passages 119, 118 and bleed orifice 117 into chamber 113. This bleed flow is assumed to be rapid enough to increase the volume of fluid in chamber 113 to a material extent and thereby compress spring 116 by forcing piston 114 downward. The pressure in chamber 113 thus increases at a fast enough rate to balance the downward force on the valve head 95 by an equal upward force on piston member 101, so that valve head 95 remains in its equilibrium position. As a consequence, the flow of fluid from main cylinder region 88 through valve 94 is damped by the maintained restricted area of orifice 90 and force is transmitted across the shock absorber. The size of the piston area of valve head member 101 for balance is, of course, determined by the fixed area relationship between these parts.

As the loading pulse drops off and, in effect, reverses, the pressure in region 89 increases with respect to that in region 88, so that upward pressure is applied to the valve head 95 as well as to the piston member 101 through expansion of spring 116. As valve head 95 opens, the piston surface of member 101 emerges from rod end 93, permitting a quick evacuation of fluid in chamber 113 to region 89. Alternately, if desired, the movement of piston member 101 would uncover ducts in valve head 95 leading to chamber 88 to allow evacuation of fluid from region 113 to region 88. In this manner, the absorber is re-cycled for another slow pulse in which piston rod 85 travels downward with respect to cylinder 83.

In the case of the low frequency pulse, as above described, with the valve head 95 moving upward in equilibrium with the main piston 84, if a high frequency upward pulse were imposed on piston rod 85, the pressure in region 88 would be momentarily increased above the low frequency pulse value existing at that time. Since fluid can flow only slowly from region 88 through passages 118, 119 and bleed orifice 117 into chamber 113, the increase in pressure in chamber 113 can not occur instantaneously, to balance the increased pressure difference across the outside bulge of valve head 95. Accordingly, valve head 95 would be driven downward during the existence of the high frequency pulse, to increase the opening of orifice 90 and prevent transmission of this high frequency pulse across the shock absorber. After the high frequency pulse passes, valve head 95 will again resume its equibrium position for the existing low frequency pulse, in preparation for another high frequency pulse applied to the piston rod in either the upward or downward direction.

From the above description, it is apparent that the shock absorbers of both Figures 1 and 2 have definite low pass characteristics, possess automatic re-cycling characteristics for both low and high frequency oscillations or pulses and can handle simultaneous application of both high and low frequency vibrations or pulses of either symmetrical or unsymmetrical nature. More specifically, in the absorber of Figure 1 the piston is not connected to the piston rod during the application of high frequency vibrations to the absorber. Consequently, the limiting high frequency at which this absorber begins to transmit load is much higher than for an absorber with a fixed piston and a variable orifice valve, since even with a wide open orifice, for high frequencies the absorber would tend to transmit forces. The absorber of Figure 2 in addition, is characterized by a small number of moving parts and the capacity for automatically dumping fluid in the control chambers to permit quick re-cycling for low frequency vibrations, even though these vibrations may be unsymmetrical. Both forms of absorbers are so constructed as to function with equal facility in opposite direction of movement so that they may be readily employed in various machine uses. Also, both forms of absorbers are characterized by use of a main piston movable at slow or rapid rates in a cylinder filled with an incompressible fluid, there being in the piston a main orifice and between the piston and orifice a chamber containing an incompressible fluid provided with a bleed orifice adapted to supply fluid to the chamber only under conditions of relatively slow piston movement.

Obviously many modifications and variations of the present invention are possible in the light of the above teachings. It is therefore to be understood that within the scope of the appended claims the invention may be practiced otherwise than as specifically described.

What is claimed is:

1. A double acting shock absorber adapted for connection between two relatively movable machine parts, comprising a closed hollow cylinder adapted for connection to one machine part, a hollow piston rod slidably extending into said cylinder along the axis thereof and adapted for connection to the other machine part, a piston having a main orifice therethrough, said piston extending transversely across and within said cylinder and dividing said cylinder into two regions, yieldable means interposed between and connecting said piston and said piston rod, means dividing the interior of said hollow piston rod into two aligned longitudinal chambers constant in total length yet individually variable in length upon movement of said hollow piston rod through said hollow cylinder, control means for varying the relative position of said piston and said piston rod including a control compartment mounted on each of the opposed faces of said piston, a control orifice in a wall of each of said control compartments, means adjustably providing for fluid communication between one of said control orifices and one of said hollow piston rod chambers, means adjustably providing for fluid communication between the other control orifice and the other hollow piston rod chamber, a port in a wall of each of said control compartments providing a fluid passageway between the control orifice of each compartment and the interior of said hollow cylinder, a valve positioned adjacent each of said control orifices for controlling flow of fluid therethrough, a piston movable in each of said control compartments, resilient means positioned in each of said control compartments between each of said control compartment pistons and each of said valves, a passageway including a restricted orifice small in area compared with said control orifices providing a fluid flow channel between one of said adjustable fluid communication means and the side of one of said control compartment pistons opposite the side thereof adjacent one of said resilient means, and a second passageway including a restricted orifice small in area compared with said control orifices providing a fluid flow channel between the other of said adjustable fluid communication means and the side of the other control compartment piston opposite the side thereof adjacent the other of said resilient means.

2. A double acting shock absorber adapted for connection between two relatively movable machine parts, comprising a hollow cylinder having closed ends adapted for connection to one machine part, a hollow piston rod adapted for connection to the other machine part and mounted for sliding movement through both of said closed ends of said cylinder along the axis thereof, means mounted within said hollow piston rod in fixed relation to said hollow cylinder for enclosing the interior portion of said piston rod extending between said hollow cylinder closed ends, means mounted within said hollow piston rod in fixed relation to said rod between said enclosing means for dividing the interior of said piston rod between said hollow cylinder closed ends into two chambers, each of said chambers being variable in length upon movement of said piston rod through said hollow cylinder, a fluid completely filling said hollow cylinder and said piston rod chambers, an annular stop fixed to the outer surface of said piston rod planar with said inner piston rod fixed chamber defining means, a control chamber having closed ends slidably mounted around said hollow piston rod within said hollow cylinder, said annular stop being disposed between said control chamber closed ends and resilient means interposed between said annular stop and each of said control chamber closed ends for normally maintaining said control chamber closed ends equidistant from said annular stop, a piston fixed externally of said control chamber between the ends thereof, said piston extending transversely across and within said hollow cylinder and having a main orifice therein for passage of fluid therethrough, said annular stop dividing said control chamber interiorly into two compartments, a port in a wall of said hollow piston rod providing a fluid passage between one of said control chamber interior compartments and one of said hollow piston rod chambers, a second port in a wall of said hollow piston rod providing a fluid passage between the other control chamber interior compartment and the other of said hollow piston rod chambers, a port in an external wall of each of said control chamber compartments providing a fluid passageway therefrom to said hollow cylinder on each side of said piston, and valve means movable to permit fluid discharge through a control chamber compartment external wall port only upon an increase of fluid pressure within the compartment at a rate above a preselected lower limit.

References Cited in the file of this patent

UNITED STATES PATENTS

| | | |
|---|---|---|
| 2,095,112 | Wallace | Oct. 5, 1937 |
| 2,161,811 | Grebe | June 13, 1939 |
| 2,244,501 | Pierce | June 3, 1941 |
| 2,668,603 | Winslow | Feb. 9, 1954 |
| 2,735,515 | Cloudsley | Feb. 21, 1956 |
| 2,803,313 | Ulmann | Aug. 20, 1957 |

FOREIGN PATENTS

| | | |
|---|---|---|
| 1,053,740 | France | Sept. 30, 1953 |
| 554,732 | Great Britain | July 16, 1943 |

OTHER REFERENCES

Ser. No. 303,885, Cupper (A.P.C.), published May 18, 1943.